United States Patent Office 3,335,566
Patented Aug. 15, 1967

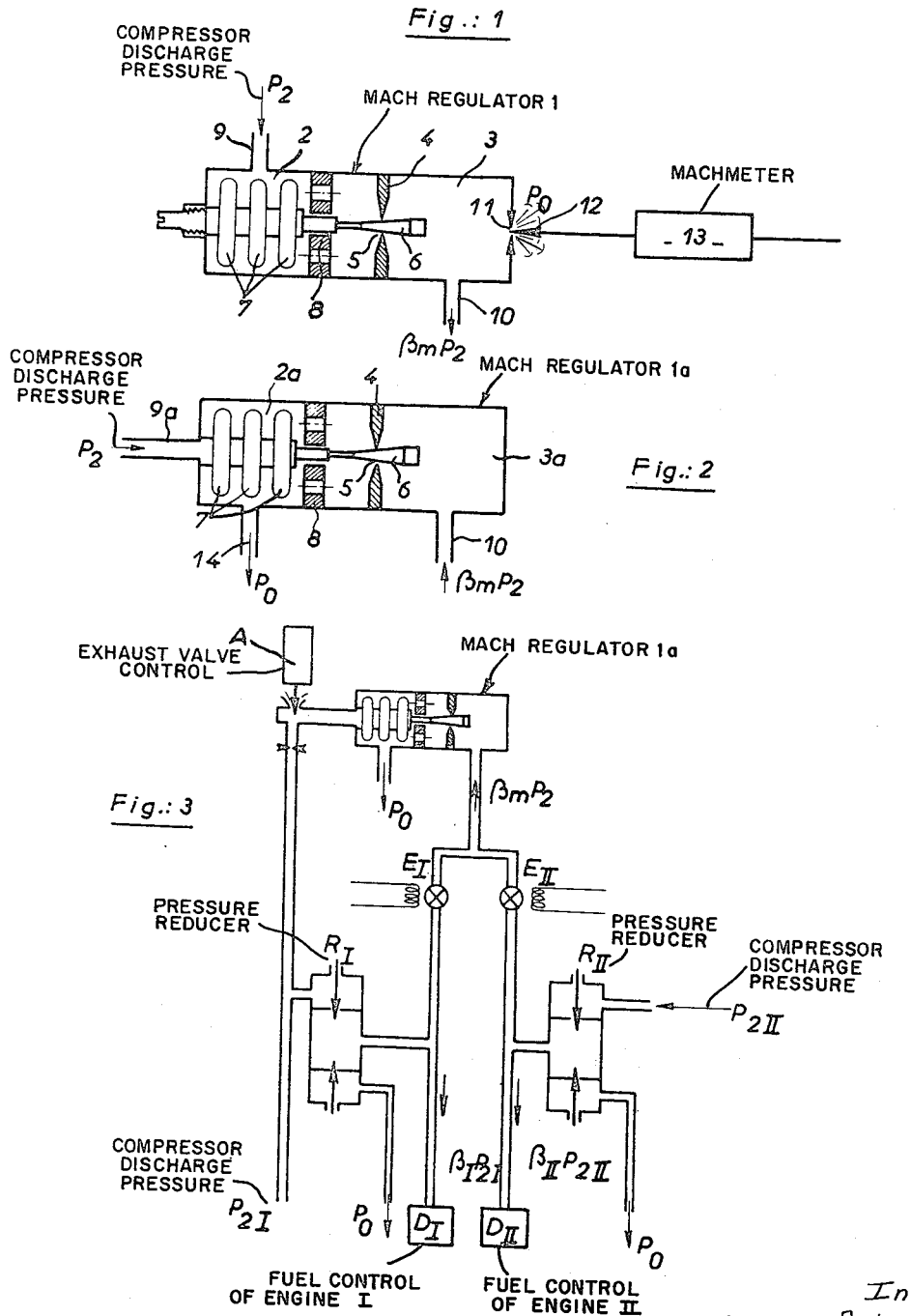

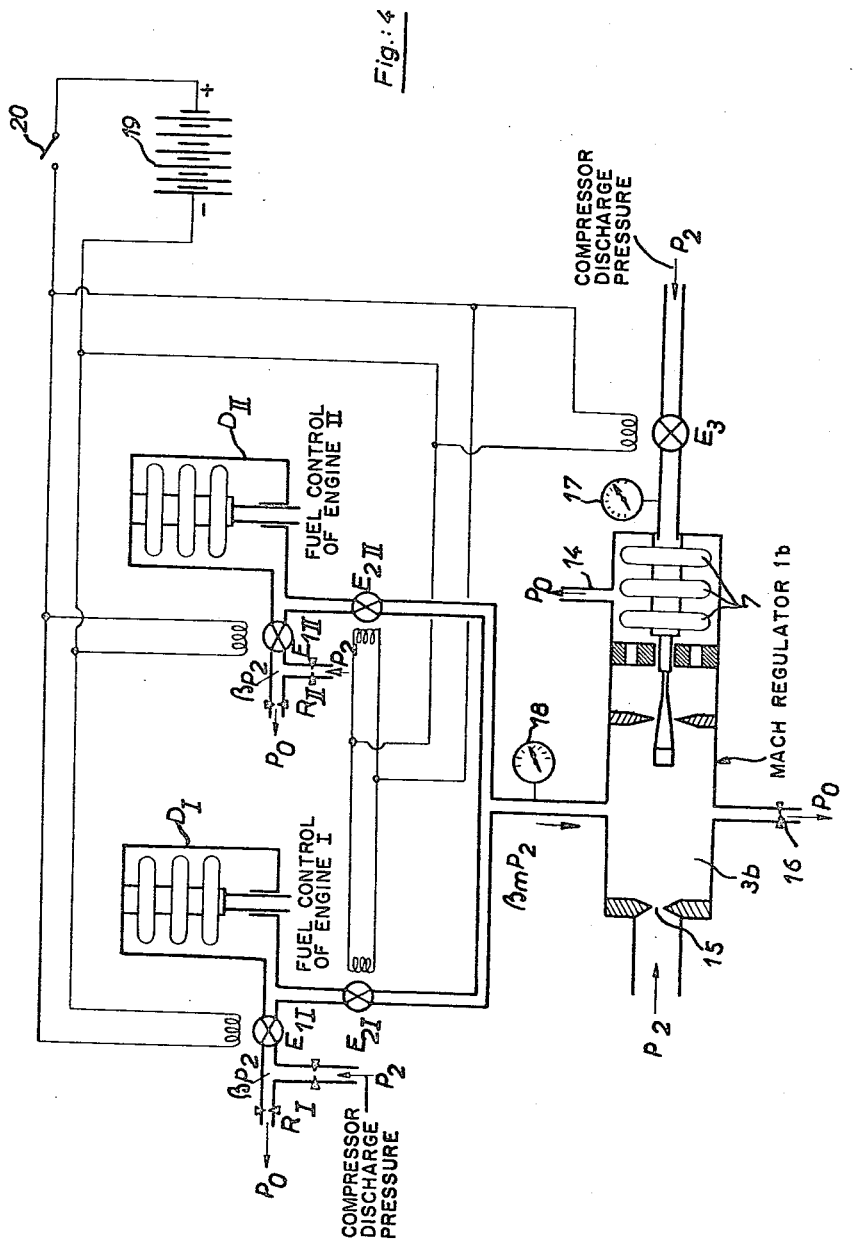

3,335,566
GAS TURBINE ENGINE FUEL REGULATING SYSTEM
Jacques Aubert, Chatenay-Malabry, Jean-Max Marie Silhouette, Moissy-Cramayel, and Michel Henri Xavier Malachier, Orleans, Loiret, France, assignors to Societe Nationale d'Etude et de Construction de Moteurs d'Aviation, Paris, France, a company of France
Filed July 29, 1964, Ser. No. 386,011
Claims priority, application France, Aug. 13, 1963, 944,610
1 Claim. (Cl. 60—39.28)

The present invention relates to the regulation of the flight Mach number of an aircraft and its object is to facilitate the task of the pilot, who is preoccupied with keeping a watch on the many control devices which the piloting of modern aircraft requires.

More precisely, the present invention proposes to maintain the cruising flight in the zone known as the zone of "optimum consumption per kilometre." For an aircraft of a given type and a specific total weight (sum of the weights of the aircraft, the fuel and the payload), it is found that there is a closed curve corresponding to a function of the flight Mach number and the altitude, this curve being called the curve of "optimum consumption per kilometre," which defines this zone and shifts towards increasing altitudes when the weight decreases (fuel consumed, dropping of bombs or load). It is inside this curve that the pilot must keep the flight Mach number and the altitude of the aircraft.

The altitude will be maintained by the automatic pilot of the aircraft, whereas the speed will be stabilized, whatever the instability of the flying conditions may be, by the Mach number regulator according to the present invention.

This regulator acts, for example, on the fuel supply of the jet engine—in particular the supply of after-burning fuel—to adapt the thrust of the engine at each moment, by causing the delivery pressure of the compressor of the jet engine (or any intermediate pressure including the inlet pressure of the compressor) to intervene as a control parameter after the application of a pressure reduction factor, its essential characteristic residing in the subordination of the said pressure reduction factor to the flight Mach number. To such extent as the altitude of the aircraft is kept constant by the action of the automatic pilot, it is sufficient to subordinate the said pressure reduction factor to the said delivery pressure which is then a function of the flight Mach number.

The description which follows with reference to the accompanying drawings and which is given by way of non-limitative example will make it clearly understood how the invention can be carried into effect, the details appearing both from the text and from the drawings forming part of the said invention.

FIGURE 1 is a diagrammatic longitudinal sectional view of a form of embodiment of a Mach regulator according to the present invention;

FIGURE 2 is a similar view of an alternative form of the regulator;

FIGURE 3 is a general diagram of the application of this regulator to a two-engined plane;

FIGURES 4 and 5 show two alternative forms of improved arrangements.

Figure 5:
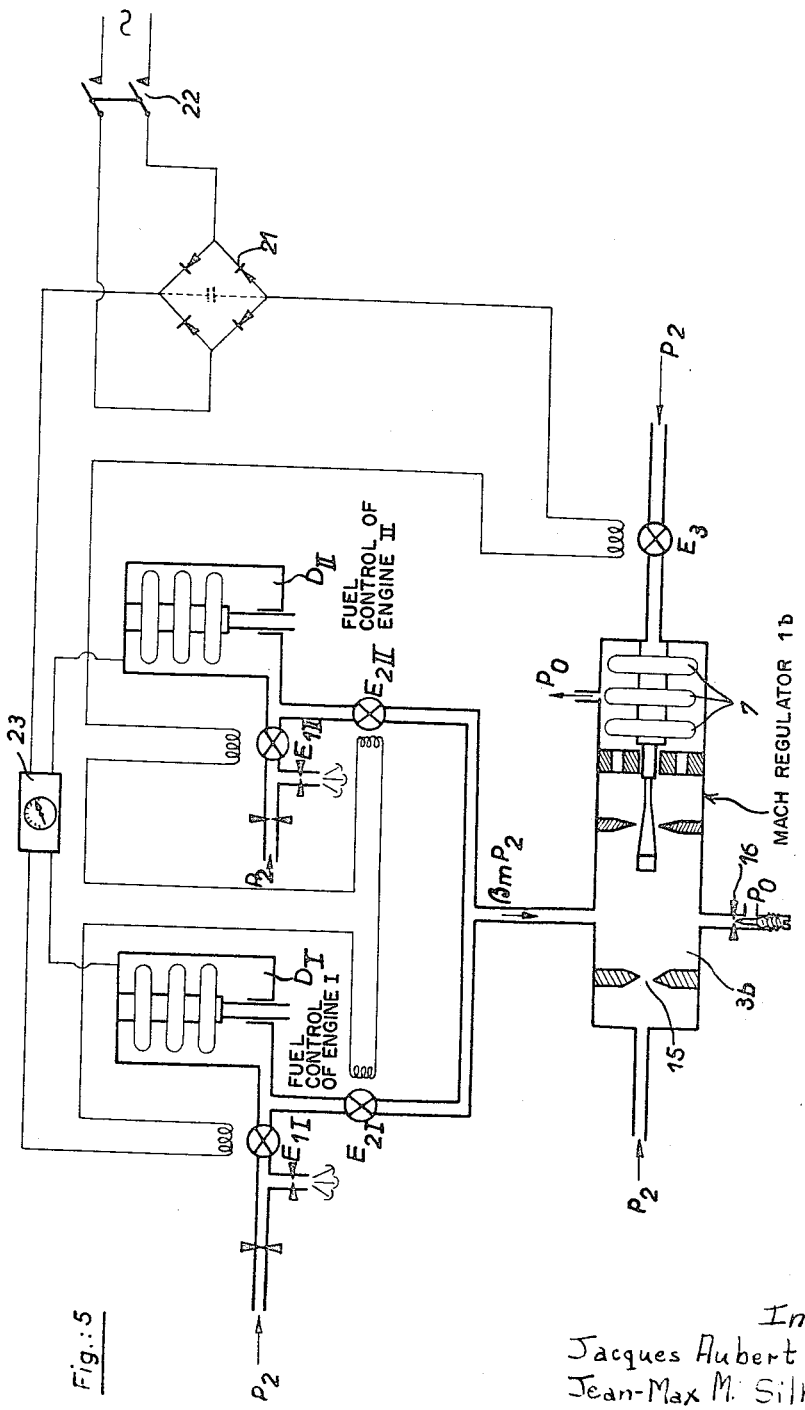

In the simplified form of embodiment shown in FIGURE 1 there is illustrated diagrammatically a pressure reducer 1 divided into two chambers or compartments 2 and 3 by a partition 4 having an orifice 5, the cross-section of which is controlled by a conical needle 6. The latter is controlled by a set of aneroid capsules 7 housed in the compartment 2, a suitable guide member 8 being provided for the sliding of the needle 6.

The first compartment 2 is open to the delivery pressure $p_2$ of the compressor of the jet engine by a pipe 9. A reduced or modulated pressure $\beta_m p_2$, in which $\beta_m$ is the pressure reduction coefficient of the pressure reducer, is transmitted through a pipe 10 extending from the second compartment 3. The direction of the conicity of the movable needle 6 is such that this coefficient varies in the inverse sense to $p_2$, that is to say $\beta_m p_2$ is reduced as $p_2$ is increased.

A second orifice 11 placing the compartment 3 in communication with the exterior at the pressure $p_0$ is closed to a greater or lesser extent by another conical needle 12 so as to adapt the pressure $\beta_m p_2$ to the required conditions. This second needle is manually controlled or remote-controlled according to the indications of a Mach meter 13. Instead of acting on this last-mentioned needle, it is possible to leave it fixed and shift the entire pressure-reducing block 1.

It will therefore be seen that in fact the pressure reducer described gives, from an inlet pressure $p_2$, a reduced pressure $\beta_m p_2$ in which the coefficient $\beta_m$ is itself modulated as a function of $p_2$.

In the modified constructional form of FIGURE 2, the pressure reducer 1a is modified by the provision of a pipe 14 which puts the compartments 2a, outside the capsules 7, at ambient pressure $p_0$, whereas the compartment 3a only has the pipe 10.

The pressure $p_2$ is transmitted to the inside of the capsules 7 through the pipe 9a. The pressure reaching the compartment 3a through the pipe 10 is relaxed or reduced to the ambient pressure $p_0$ through the restricted orifice 5 in accordance with the movement of the same conical needle device 6 connected to the capsules 7. The supplementary escape offered to the pressure by the pipe 10 modulates this pressure to $\beta_m p_2$ as before.

By way of illustration, an example of the application of the invention to a two-engined plane to a given Mach number will be given hereinafter with reference to FIGURE 3 (the parts corresponding to the two engines being allotted the respective indices I and II).

The usual pressure reducers $R_I$ and $R_{II}$ of the after-burning regulators are connected to a Mach regulator $1a$ similar to that shown in FIGURE 2 through the medium of two electric cocks $E_I$ and $E_{II}$.

In normal after-burning regulation, the two electric cocks $E_I$ and $E_{II}$ are closed and the reduced pressure, with constant coefficients $\beta_I$ and $\beta_{II}$, acts on the capsules of the devices $D_I$ and $D_{II}$ metering the after-burning fuel of the respective engines.

To put the Mach regulator according to the invention into use, the pilot pushes the after-burning hand lever into the "full throttle" position and, having reached the desired Mach number he opens the two electric cocks $E_I$ and $E_{II}$. The two reduced pressures $\beta_I p_{2I}$ and $\beta_{II} p_{2II}$ of the after-burning regulators are connected together to the variable leakage which is a function of $p_{2I}$ of the Mach regulator $1a$ to give the common modulated pressure $\beta_m p_2$, which now acts on the capsules of the after-burning metering devices $D_I$ and $D_{II}$ of the two jet engines.

A means of adaptation acting either directly on the supply at $p_{2I}$ (as shown at A), or on the reduced pressure $\beta_m p_2$, enables this reduced pressure to be adjusted.

To render operation independent of the after-burning regulation, that is to say in order to obviate inter-action of the reduced pressures of each of the pressure reducers, between these pressures, on the one hand, and with the reduced pressure of the regulator, on the other hand, the various pressure reducers can be isolated by means of electric cocks, as shown in FIGURE 4.

In this case, the pressure $\beta_m p_2$ is produced directly from $p_2$ without the intervention of the normal reducers. Thus, the Mach regulator $1b$, if of the type having its capsules 7 supplied internally (like $1a$), must have a second supply of its compartment $3b$ with $p_2$; this supply is effected through a restricted orifice 15, whereas a leakage at the ambient pressure $p_0$ is provided through a restricted orifice 16.

In normal after-burning operation, two electric cocks $E_{1I}$ and $E_{1II}$ connecting the pressure reducers $R_I$ and $R_{II}$ to the control capsules of the metering devices $D_I$ and $D_{II}$ of each of the jet engines are in the "normally open" position, whereas electric cocks $E_{2I}$, $E_{2II}$ and $E_3$, which are in the "normally closed" position, ensure the cutting out of circuit of the Mach regulator $1b$.

The latter is put into use by closing the two electric cocks $E_1$ and opening the three electric cocks $E_2$ and $E_3$. An upstream pressure gauge 17 and a downstream pressure gauge 18 indicate the correct coming into operation of the Mach regulator and also give the values of the inlet pressure $p_2$ and of the modulated reduced pressure $\beta_m p_2$.

To provide against electrical breakdowns, it is possible to resort to any known safety method. The electric cocks of FIGURE 3 can be connected in series or else be supplied by mechanically connected cut-outs or by interlinked relays, so that an electrical break in one releases the relay supplying the other.

If sufficient voltage is available, the arrangement of FIGURE 4 may with advantage be supplied in series. If the source of supply 19 is a direct one, a simple contactor 20 will be sufficient. If the supply voltage is single-phase or three-phase alternating-current voltage, a group of rectifiers 21 (FIGURE 5) downstream of the switch 22 will be used, in accordance with the technique customarily employed by electrical engineers.

In order to avoid the drawbacks of any unbalance of the after-burning charges between the two jet engines due to a mechanical failure of either an electric cock or a capsule, the chambers $D_I$ and $D_{II}$ of the regulator capsules will advantageously be joined by a differential manometric contact 23 or other equivalent device, so as to put the Mach regulator $1b$ out of use automatically in the event of any difficulty; under these conditions, the pilot will immediately return to normal after-burning regulation.

It is obvious that modifications may be made in the forms of embodiment which have just been described, in particular by substituting equivalent technical means, without thereby departing from the scope of the present invention.

We claim:

In an aircraft operable to fly at constant altitude and powered by a jet propulsion unit having a compressor, means for tapping high-pressure fluid from said compressor, low-pressure responsive means, and a fuel-flow metering system under the control of said low-pressure responsive means, a pneumatically operated regulator having an input connected with said high-pressure fluid tapping means and a chamber supplied with fluid pressure, an orifice connecting said chamber with said low-pressure responsive means, and a pressure regulator including a pressure responsive means connected with said input and directly and solely movable in response to pressure variations of said high-pressure fluid, a movable member which creates a pressure change at said orifice in accordance with the position thereof to determine the level of said low pressure, and linking means extending between said pressure responsive means and said member for adjusting the position of said member in accordance with the displacement of said pressure responsive means, the arrangement being such that an increase in pressure of said high-pressure fluid causes a decrease in pressure at said orifice, and inversely.

References Cited

UNITED STATES PATENTS

| | | | |
|---|---|---|---|
| 2,729,061 | 1/1956 | Grafinger et al. | 60—39.28 |
| 2,742,755 | 4/1956 | Davies et al. | 60—241 |
| 2,765,619 | 10/1956 | Peterson | 60—39.28 |
| 2,789,417 | 4/1957 | Kuzmitz | 60—39.28 X |
| 2,804,084 | 8/1957 | Greenland. | |
| 2,806,353 | 9/1957 | Grafinger et al. | 60—39.28 |
| 2,882,680 | 4/1959 | Jamison et al. | 60—39.28 |
| 2,946,189 | 7/1960 | Basford | 60—39.28 |
| 2,984,977 | 5/1961 | Embree | 60—39.28 |

JULIUS E. WEST, *Primary Examiner.*